United States Patent
Keohane et al.

(10) Patent No.: US 7,895,528 B2
(45) Date of Patent: Feb. 22, 2011

(54) SYSTEM AND METHOD FOR REVERSING A WINDOWS CLOSE ACTION

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1781 days.

(21) Appl. No.: 10/912,499

(22) Filed: Aug. 5, 2004

(65) Prior Publication Data

US 2006/0031781 A1 Feb. 9, 2006

(51) Int. Cl.
G06F 3/048 (2006.01)
G06F 3/00 (2006.01)

(52) U.S. Cl. .................. 715/807; 715/781; 715/783; 715/789; 715/806

(58) Field of Classification Search .............. 715/781, 715/783, 789, 806, 807
See application file for complete search history.

(56) References Cited

U.S. PATENT DOCUMENTS

| | | | | |
|---|---|---|---|---|
| 4,954,818 A | * | 9/1990 | Nakane et al. ............... 715/790 |
| 5,600,346 A | * | 2/1997 | Kamata et al. ............... 715/807 |
| 5,694,561 A | * | 12/1997 | Malamud et al. ............ 715/805 |
| 5,835,090 A | * | 11/1998 | Clark et al. .................. 715/764 |
| 6,044,475 A | * | 3/2000 | Chung et al. .................. 714/15 |
| 6,594,779 B1 | * | 7/2003 | Chandra et al. ............... 714/15 |
| 6,802,025 B1 | * | 10/2004 | Thomas et al. ................ 714/15 |
| 6,874,138 B1 | * | 3/2005 | Ziegler et al. ............... 717/127 |
| 7,076,692 B2 | * | 7/2006 | Grey ............................ 714/15 |
| 7,231,544 B2 | * | 6/2007 | Tan et al. ...................... 714/15 |
| 2002/0169795 A1 | * | 11/2002 | Elliott et al. ................ 707/500 |
| 2004/0066414 A1 | * | 4/2004 | Czerwinski et al. ......... 345/781 |

\* cited by examiner

*Primary Examiner*—Weilun Lo
*Assistant Examiner*—Nicholas Augustine
(74) *Attorney, Agent, or Firm*—VanLeeuwen & VanLeeuwen; Diana R. Gerhardt

(57) ABSTRACT

A system and method for reversing a windows close action is provided. The system retains data corresponding to a window after the window is closed for some period of time. The parameters by which the closed window data is retained is user-configurable. When a window is closed, data corresponding to the closed window is not reclaimed by the operating system. Instead, the operating system notes that the window is no longer being managed by the operating system so that no new messages, or signals, are sent to or from the closed window. In addition, the visual aspects of the closed window are removed from the user's display so that, from the user's perspective, the closed window appears to have been closed as in a traditional GUI operating system. The system further reclaims memory from inactive windows according to user-configurable parameters.

11 Claims, 9 Drawing Sheets

SYSTEM AND METHOD FOR REVERSING A WINDOWS CLOSE ACTION

BACKGROUND OF THE INVENTION

1. Technical Field

The present invention relates in general to a system and method for reversing a windows close action. More particularly, the present invention relates to a system and method that allows a user to recover a window that was inadvertently closed.

2. Description of the Related Art

Modern computer systems often use Graphical User Interfaces (GUIs) to interact with a user of the computer system in an intuitive manner. A GUI environment uses "windows" to display information to the user and to receive information from a user. In a GUI environment, applications that are opened usually have one or more windows that are displayable on the computer system's display.

Windows can be often be arranged and resized depending upon the user's preference. For example, if a user is using an Internet Browser, such as Microsoft's Internet Explorer™, or Netscape's Navigator™, along with an email program, such as IBM's Lotus Notes™, the user can size the windows so that both appear on the display at the same time or each window can be "maximized" in order to fill the entire display with the application that the user is currently user being displayed and the other application being "hidden." The application that the user is currently using, regardless of whether a maximized window is being used, is called the window with "focus." The user switches, or "focuses," on another window by interacting with the computer system. For example, in some operating systems a task bar is displayed on the screen with an icon corresponding to each of the viewable applications currently in operation. Also, keyboard commands, such as "Alt-Tab," can often be used to scroll from one application to the next with the scrolling providing focus to each of the available applications.

The operating system keeps track of the windows that are currently in operation along with a multitude of data regarding each of the windows. This data includes a window "handle" which is an address that is used by the operating system and other applications to address a particular window. Each window has a unique handle, or address, that is used to reference the window. For each unique window handle, the operating system keeps track of data such as whether the window is currently hidden or visible, the location of the window (coordinates) on the display, whether the window is maximized or minimized, whether the window currently has focus, along with a multitude of other data about the window.

While providing windows in a GUI environment generally makes computing more intuitive and somewhat easier, the GUI environment and associated windows are challenged by the ease at which a window can be closed. This challenge is exacerbated by the fact that windows can be overlaid upon one another so that the user may wish to close a particular window but may accidentally select the close icon associated with a window but actually select a close icon associated with a different window, thus closing the wrong window. Additionally, the user may close a window, such as the Web browser application and, a moment later, realize that he wanted to view additional information on the Web page that was being displayed. In a traditional GUI environment, the user, in these situations, would be forced to re-initialize the closed application and re-enter data (such as the domain name of the Web site that was used) in order to get the window to display the same data that was displayed prior to being closed. Additionally, in some situations, data, such as a word processing document, that was not saved prior to the inadvertent "close" request may be lost altogether.

What is needed, therefore, is a system and method that allows a user to recover from an inadvertent window close request in a GUI environment. Furthermore, what is needed is a system and method that recovers resources associated with the closed window, such as application data, and restores the window appropriately using the recovered resources. Finally, what is needed is a system and method that allows a user to configure the resource usage of the window recover system and determine when, or under what circumstances, resources associated with closed windows, such as memory, are reclaimed by the operating system.

SUMMARY

It has been discovered that the aforementioned challenges are resolved with a system and method that retains resources corresponding to a window after the window is closed for some period of time. The parameters by which the resources for the closed window are retained is user-configurable. When a window is closed, resources, such as memory, corresponding to the closed window are not reclaimed by the operating system. Instead, the operating system notes that the window is no longer being managed by the operating system so that no new messages, or signals, are sent to or from the closed window. In addition, the visual aspects of the closed window are removed from the user's display so that, from the user's perspective, the closed window appears to have been closed as in a traditional GUI operating system.

If the user discovers that they closed the window inadvertently or have changed their mind about closing the window after the window has been closed, the user requests "recovery" of a window. A list of all "recoverable" windows is presented to the user and the user selects the window that he would like to recover. The operating system notes that the "recovered" window is now an active window, managed by the operating system, and re-displays the visual aspects of the closed window based upon the window resources that correspond to the recovered window.

Recognizing that resources, such as memory, corresponding to closed windows cannot be retained indefinitely, the system allows the user to determine the conditions under which resources corresponding to closed window data are reclaimed by the operating system. When these conditions occur, such as a time limit or a resource threshold level, the system reclaims the resources corresponding to the closed window data. When resources corresponding to a closed window have been reclaimed by the system, the corresponding window is no longer selectable by the user as a "recoverable" window.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
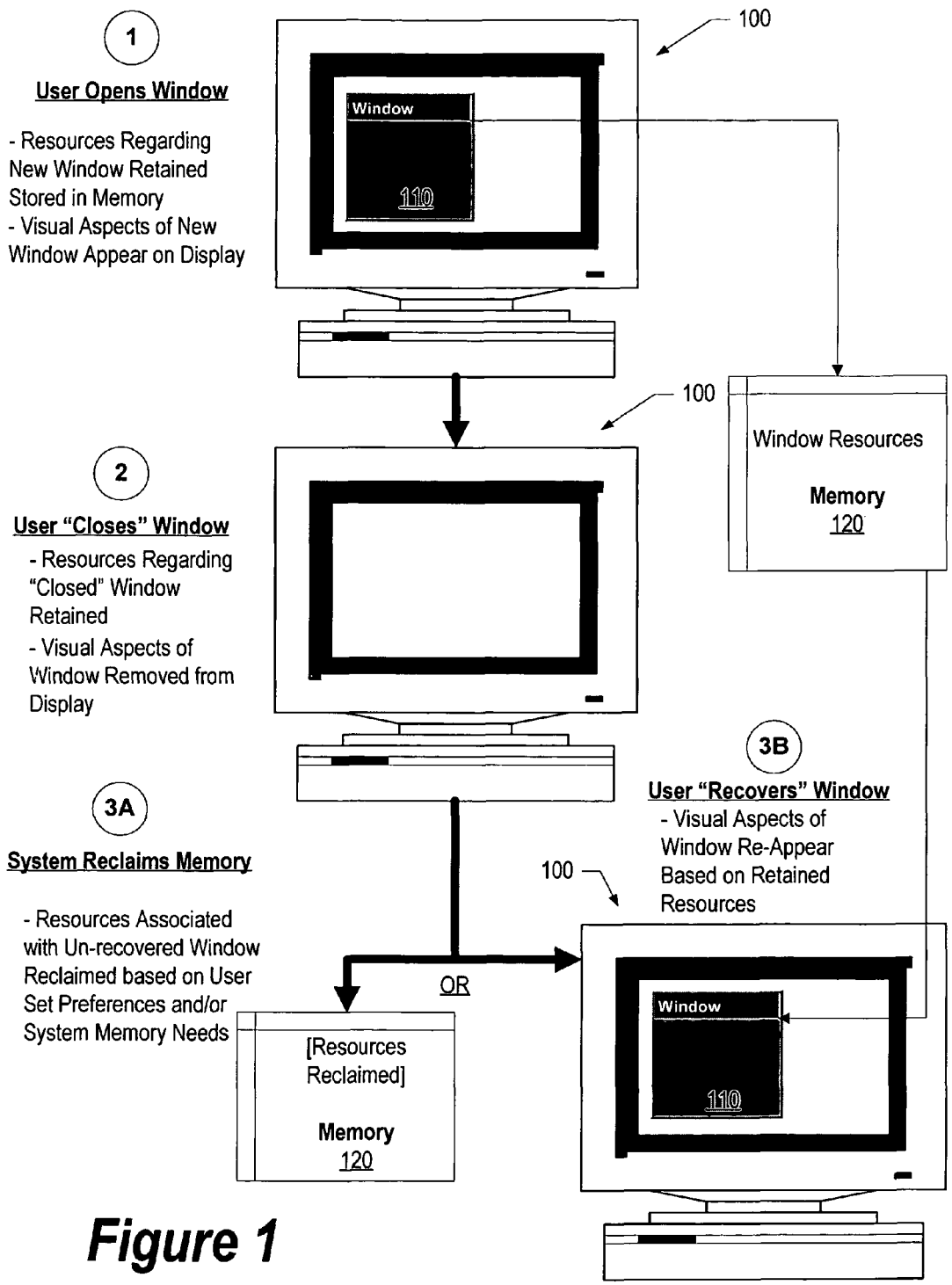
FIG. 1 is a diagram showing a user closing a window and subsequently recovering the window.

FIG. 1 is a diagram showing a user closing a window and subsequently recovering the window. At step 1, the user performs an action causing Window 110 to appear on display 100. Resources regarding window 110 is stored in memory 120. Such resources may include a data structure with various data elements used to describe various aspects of the window. For example, color, window position and size, and focus information is typically included in a data structure stored in memory 120.

Subsequently, at step 2, the user "closes" window 110 so that visual aspects of the window are removed from display 100. However, the resources used to create the window (stored in memory 120) are not removed and are retained so that the window can, if the user desires, be subsequently restored. In addition, the operating system typically keeps a table or list of the addresses (i.e., "handles") of active windows. When the window is closed, the window is flagged as being "closed" by either removing the window's handle from the active window list or by indicating, in the active window list, that the particular window is effectively "closed" while still retaining the address of the window for subsequent recovery, if requested by the user.

One of two actions then occurs. Either the window is not "recovered" within a timeframe corresponding to a policy set by the user and the memory corresponding to the window is reclaimed, or the user decides that he did not want to close the window and requests "recovery" of the closed window. A policy can be based on time or memory-constraints or may include aspects of both time and memory constraints. For example, the user could set a policy requesting that memory corresponding to any window that is not reclaimed within thirty minutes automatically be reclaimed by the system. The user could set a different policy to only reclaim memory when system memory is constrained at a given level (e.g., reclaim memory corresponding to closed window data when more than 75% of system memory is being used regardless of how much time has elapsed since the user closed the window). Finally, the policy can be both time and memory-constraint based (e.g., reclaim memory corresponding to closed window data when either thirty minutes have elapsed or whenever 90% of system memory is being used).

If the memory corresponding to the window data is reclaimed (step 3A), then the resources used to create the window (such as data structures, etc.) are removed from memory 120 and the window is no longer "recoverable." However, if the resources corresponding to the window data have not been reclaimed and the user requests recovery of the closed window (step 3B), then the window's resources are "recovered" and visual aspects of the window 110 re-appear on display 100 based upon the resources that were retained in memory 120. In one embodiment, the list of windows being managed by the operating system is modified so that a record corresponding to the "recovered" window is modified indicating that the window is now "active" rather than "closed." In another embodiment, two separate lists are maintained—one for active windows and one for closed windows. In this embodiment, the record pertaining to the "recovered" window is removed from the closed window list and a record corresponding to the "recovered" window is added to the active window list.

Figure 2:
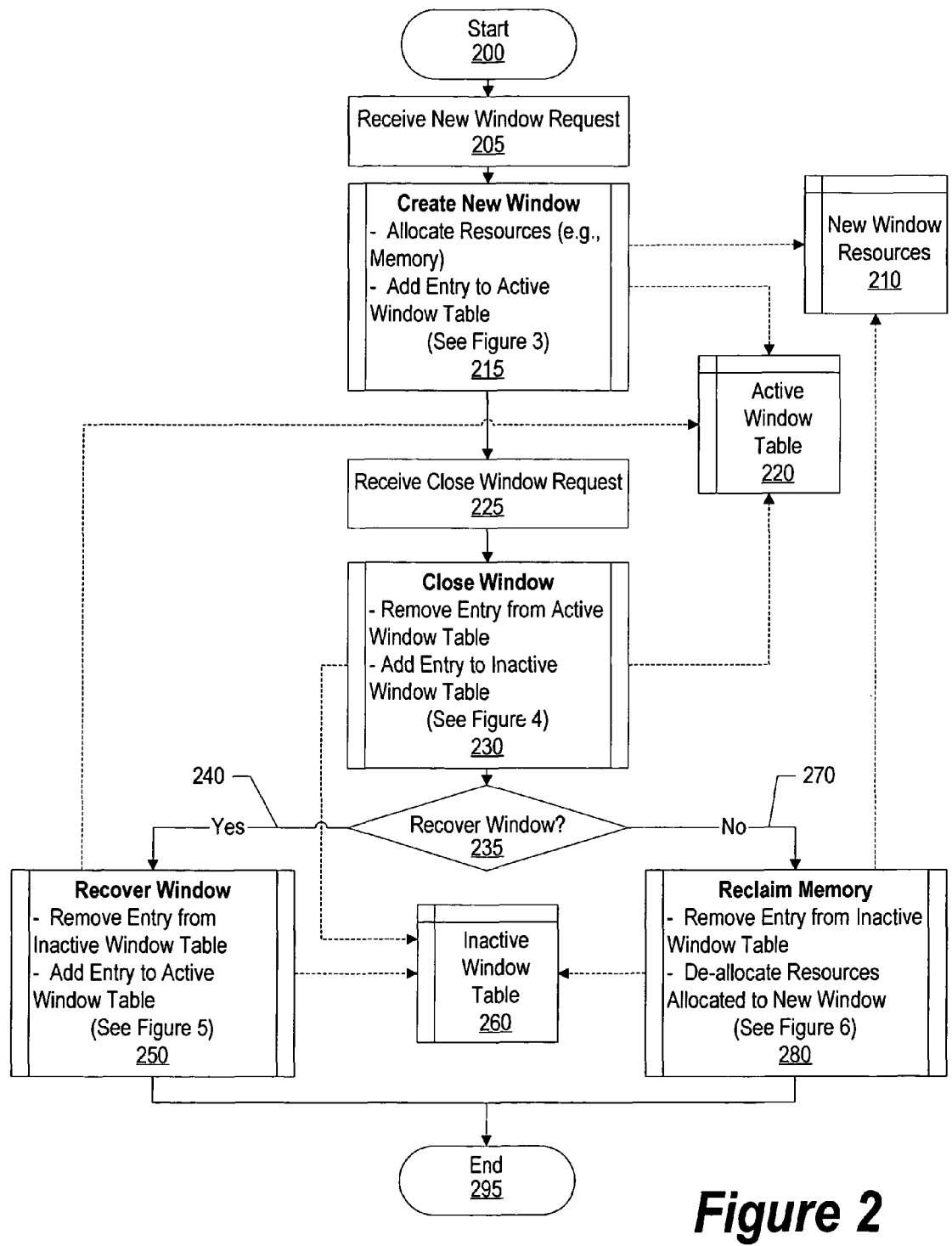
FIG. 2 is a high level flowchart showing steps taken in recovering data associated with a closed window.

FIG. 2 is a high level flowchart showing steps taken in recovering resources associated with a closed window. Processing commences at 200 whereupon, at step 205, the system receives a request to create a new window. The request could be from the user or from an application program currently being executed by the computer system. A new window is created in response to the request with memory being allocated to store resources corresponding to the new window (memory 210) and an entry being added to a table (or list structure), such as Active Window Table 220, that the new window is a window that is currently being managed by the operating system (predefined process 215, see FIG. 3 and corresponding text for processing details). After the window has been created, the user uses the window (e.g., views data presented in the window, enters data into the window, etc.).

Figure 4:
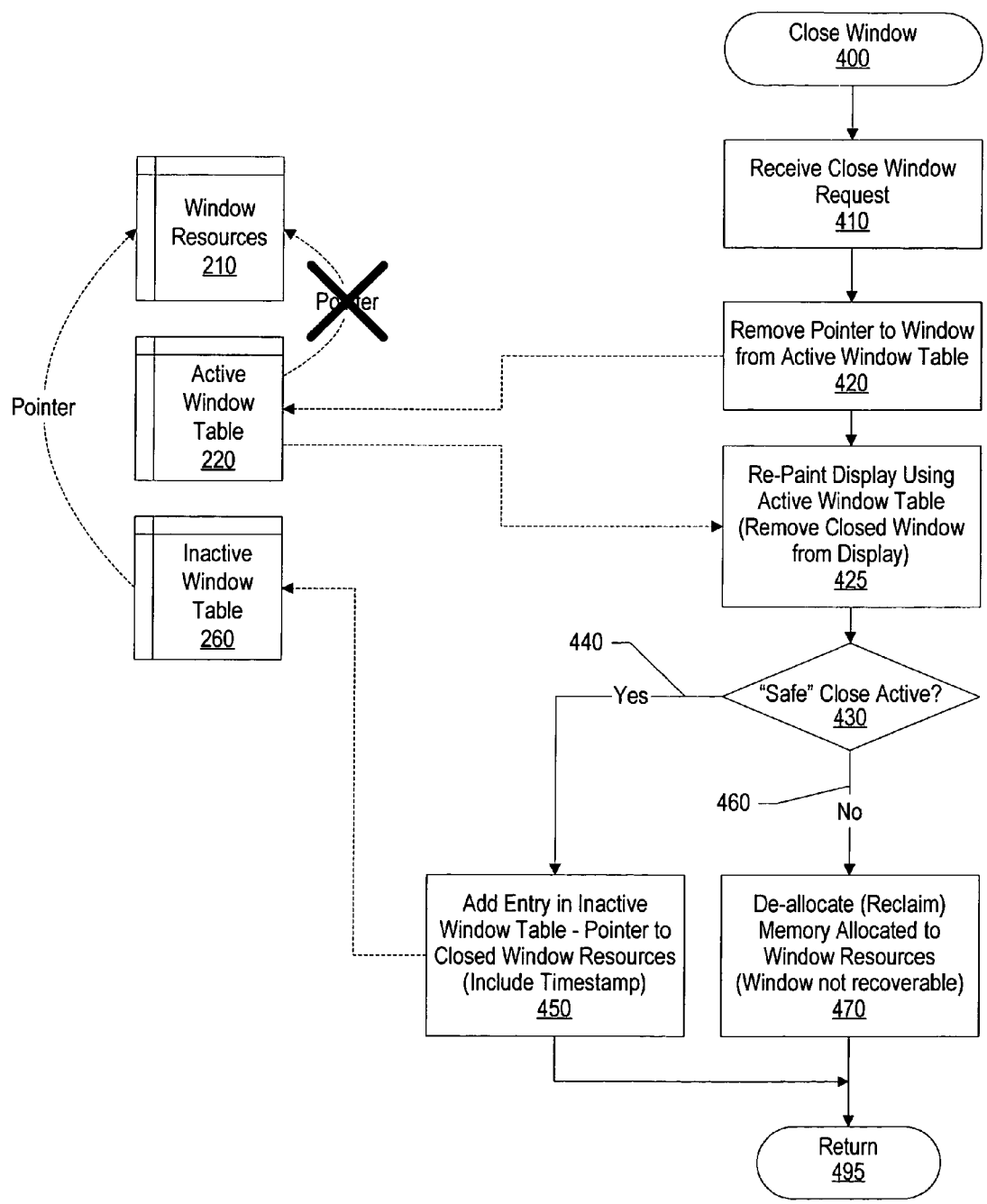
FIG. 4 is a flowchart showing steps taken in responding to a close window request but allowing the window data to be subsequently recovered.

At some point after the new window was created, the user closes the window (predefined process 230, see FIG. 4 and corresponding text for processing details). The user may close the window by selecting an icon on the window (such as an "X" icon) that corresponds to a close request for the window, by issuing a command from a command prompt or by selecting a menu item, by pressing a particular key (e.g., a function key, the "Escape" key, etc.), or any number of ways in which the window is programmed to respond by exiting (closing). When the window is closed by the user, the entry corresponding to the window is changed to note that the window is no longer an active window. In FIG. 2, the entry is removed from Active Window Table 220 and added to Inactive Window Table 260. However, it will be appreciated by those skilled in the art, that a notation of whether a window is active can be accomplished in many other ways. For example, a single "Window Table" can be maintained with a field, such as a Boolean flag, indicating whether the window corresponding to the entry in the table is active.

A determination is made as to whether the closed window is recovered (decision 235). If the closed window is recovered, decision 235 branches to "yes" branch 240 whereupon the window is recovered by removing the entry in Inactive Window Table 260 and adding an entry in Active Window Table 220 in order to vindicate that the window corresponding to Window Resources 210 is now active (predefined process 250, see FIG. 5 and corresponding text for processing details). Processing thereafter ends at 295.

Figure 6:
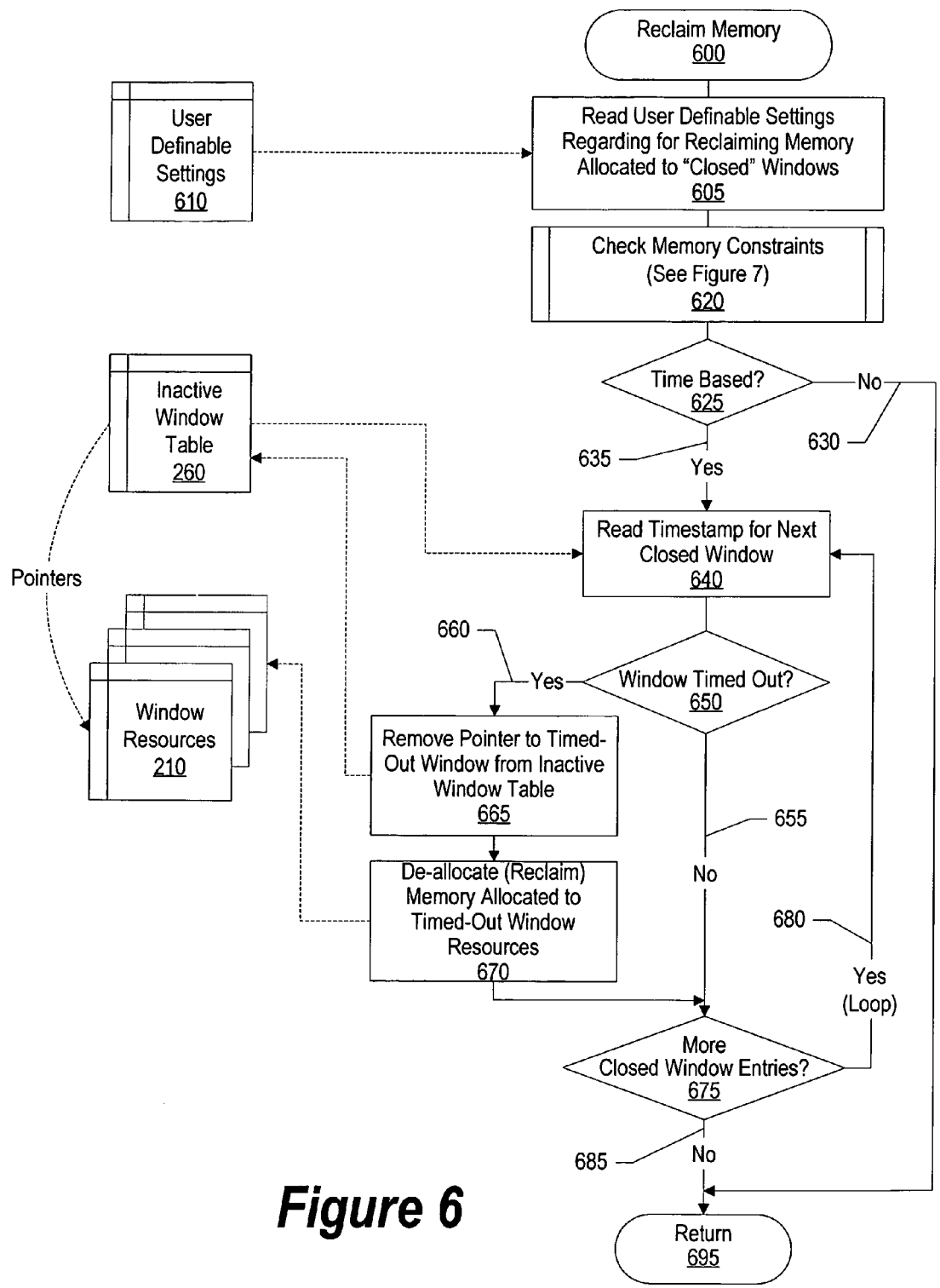
FIG. 6 is a flowchart showing steps taken by the operating system to reclaim memory associated with closed windows.

On the other hand, if the window is not recovered, decision 235 branches to "no" branch 270 whereupon the memory used to store Window Resources 210 is reclaimed by the operating system and the entry that was written to Inactive Window Table 260 is removed (predefined process 280, see FIG. 6 and corresponding text for processing details). Once the memory used to store the window resources has been reclaimed and the entry has been removed, the closed window will no longer be recoverable by the user. Processing thereafter ends at 295.

Figure 3:
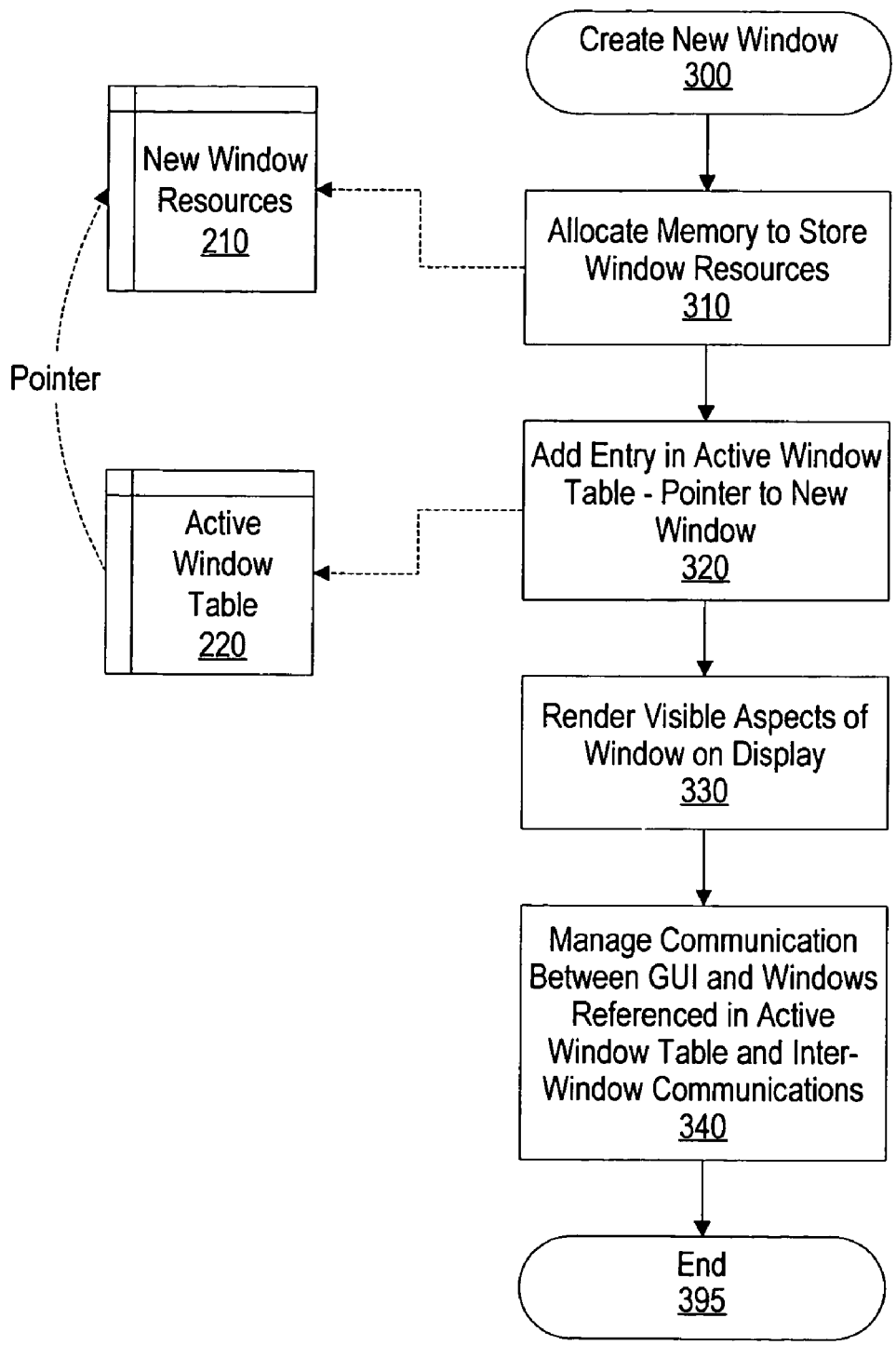
FIG. 3 is a flowchart showing steps taken in creating a new window so that the data of the new window can be recovered if the window is closed.

FIG. 3 is a flowchart showing steps taken in creating a new window so that the data of the new window can be recovered when the window is closed. Create new window processing commences at 300 whereupon, at step 310, memory is allocated to store new window resources 210. The memory that was allocated has a starting address, sometimes called a "handle" or a "pointer." At step 320, the pointer to the new window resources is added to Active Window Table 220. At step 330, visual aspects of the newly created window are rendered on the display. The operating system then manages communication between the Graphical User Interface (GUI) and the windows referenced in the Active Window Table 220 (i.e., the GUI actions performed by the user on an active window) as well as managing communications between windows (inter-windows communications) at step 340. The operating system continues its management functions of active windows until the windows are no longer active (i.e., have been closed) or until the system is shutdown by the user. Create new window processing thereafter ends at 395.

FIG. 4 is a flowchart showing steps taken in responding to a close window request and allowing the window data to be subsequently recovered. Close window processing commences at 400 whereupon, at step 410, a close window request is received from a user. The pointer that points to the window resources that correspond to the window that is being closed (Window Resources 210) is removed from Active Window Table 220 at step 420. At step 425, the display is repainted (i.e., refreshed), however, because the window data corresponding to the closed window is no longer active, the display is refreshed without displaying visual aspects of the closed window.

A determination is made as to whether "safe" closing of windows has been activated allowing the user to recover closed windows (decision 430). If "safe" closing has been activated, decision 430 branches to "yes" branch 440 whereupon, at step 450, an entry is made to Inactive Window Table 260 with a pointer to Window Data 260. In addition, a current timestamp is written to the entry in the Inactive Window Table in order to determine, at a later point, whether to reclaim memory used to store Window Resources 210. Processing thereafter returns to the calling routine at 495.

On the other hand, if "safe" closing of windows has not been activated, decision 430 branches to "no" branch 460 whereupon, at step 470, the memory used to store Window Resources 210 is de-allocated (i.e., reclaimed), no entry is written to Inactive Window Table 260, and, consequently, the closed window is not recoverable. Processing thereafter returns to the calling routine at 495.

Figure 5:
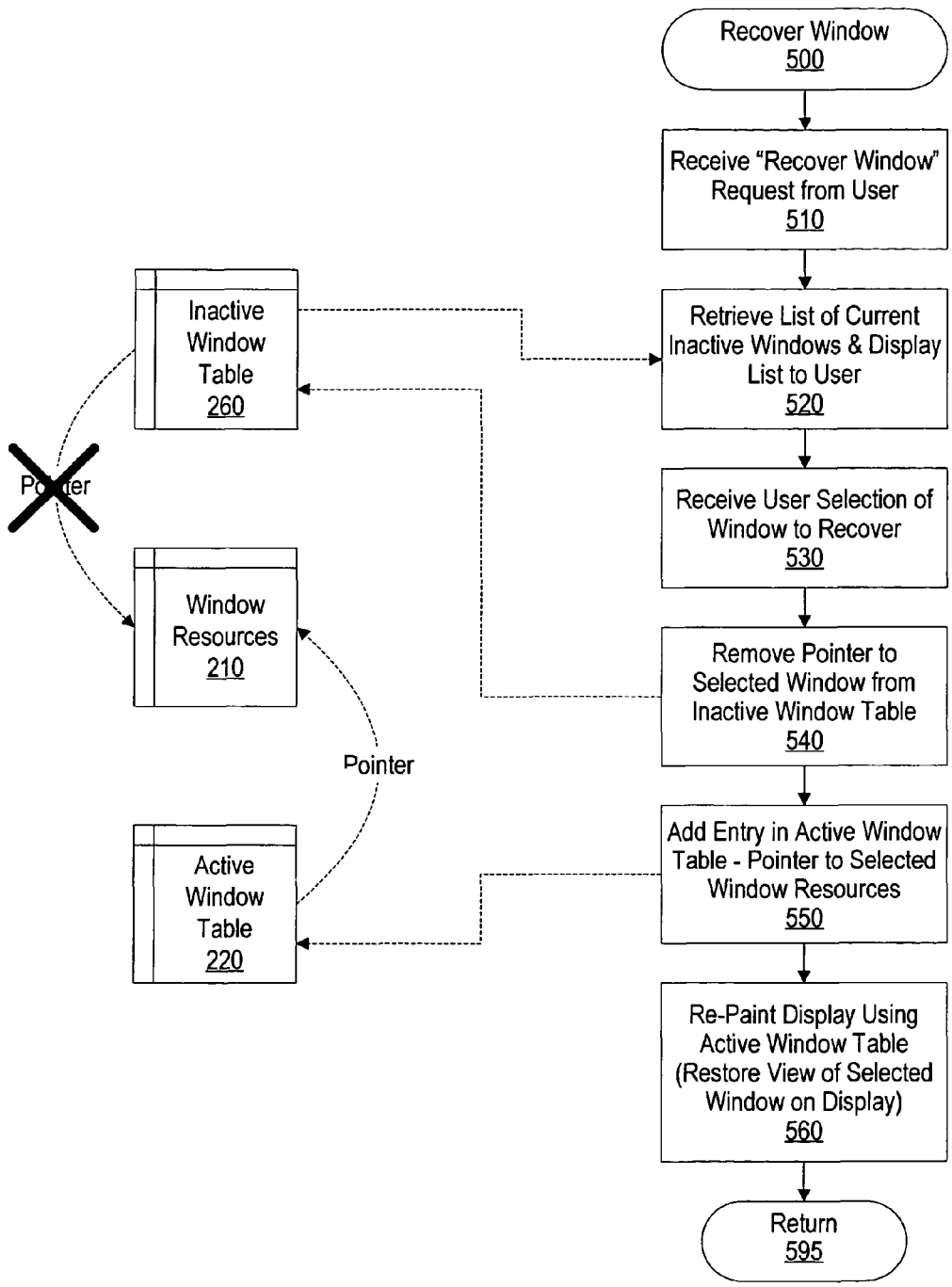
FIG. 5 is a flowchart showing steps taken in responding to a recover window request to recover window data associated with a previously closed window.

FIG. 5 is a flowchart showing steps taken in responding to a recover window request to recover resources associated with a previously closed window. Recover window processing commences at 500 whereupon, at step 510, a "recover window" request is received from the user. In response to receiving the request, the list of current inactive windows is retrieved from Inactive Window Table 260 and displayed to the user at step 520. At step 530, the user selects one of the windows (displayed in step 520) that the user wishes to recover. In response to the user's selection, the system removes the pointer from Inactive Window Table 260 (step 540). At step 550, an entry with the pointer to Window Resources 210 is added to Active Window Table 220. At this point, the "closed" window has been recovered as the pointer to the resources that is used to create/display the window is now back in the Active Window Table and is being managed by the operating system. In order to re-display the visual aspects of the recovered window, the display is re-painted (i.e., refreshed) at step 560 whereupon the visual aspects of the restored window will be viewable on the display. Processing thereafter returns to the calling routine at 595.

FIG. 6 is a flowchart showing steps taken by the operating system to reclaim resources used associated with closed windows. Processing commences at 600 whereupon, at step 605, User Definable Settings 610 regarding the reclamation of resources allocated to "closed" windows are read. A check is made to determine whether the computer system's resources, such as memory, are currently constrained (predefined process 620, see FIG. 7 and corresponding text for processing details).

A determination is made as to whether there is a time-based user-definable setting in place that needs to be processed (decision 625). If time-based criteria is not in place, decision 625 branches to "no" branch 630 and processing returns at 695.

On the other hand, if a time-based user-definable setting is in place, decision 625 branches to "yes" branch in order to evaluate inactive windows using time-based criteria. At step 640, the timestamp corresponding to the first inactive window stored in Inactive Window Table 260 is read. A determination is made as to whether the inactive window has timed out (decision 650). For example, if a one-hour time out is in place and the inactive window has been inactive for an hour or more, then the window has timed out. If the window has timed out, decision 650 branches to "yes" branch 660 whereupon, at step 665, the entry in Inactive Window Table 260 is deleted and, at step 670, the resources allocated to the inactive window (Window Resources 210), such as memory, are de-allocated and reclaimed by the operating system.

Returning to decision 650, if the window data has not timed out, decision 650 branches to "no" branch 655 bypassing steps 665 and 670.

A determination is made as to whether there are more inactive window entries in Inactive Window Table 260 (decision 675). If there are more inactive window entries to process for time-based criteria, decision 675 branches to "yes" branch 680 which loops back to process the next entry in Inactive Window Table 260. This looping continues until there are no more entries to process in Inactive Window Table 260, at which point decision 675 branches to "no" branch 685 and processing returns at 695.

Figure 7:
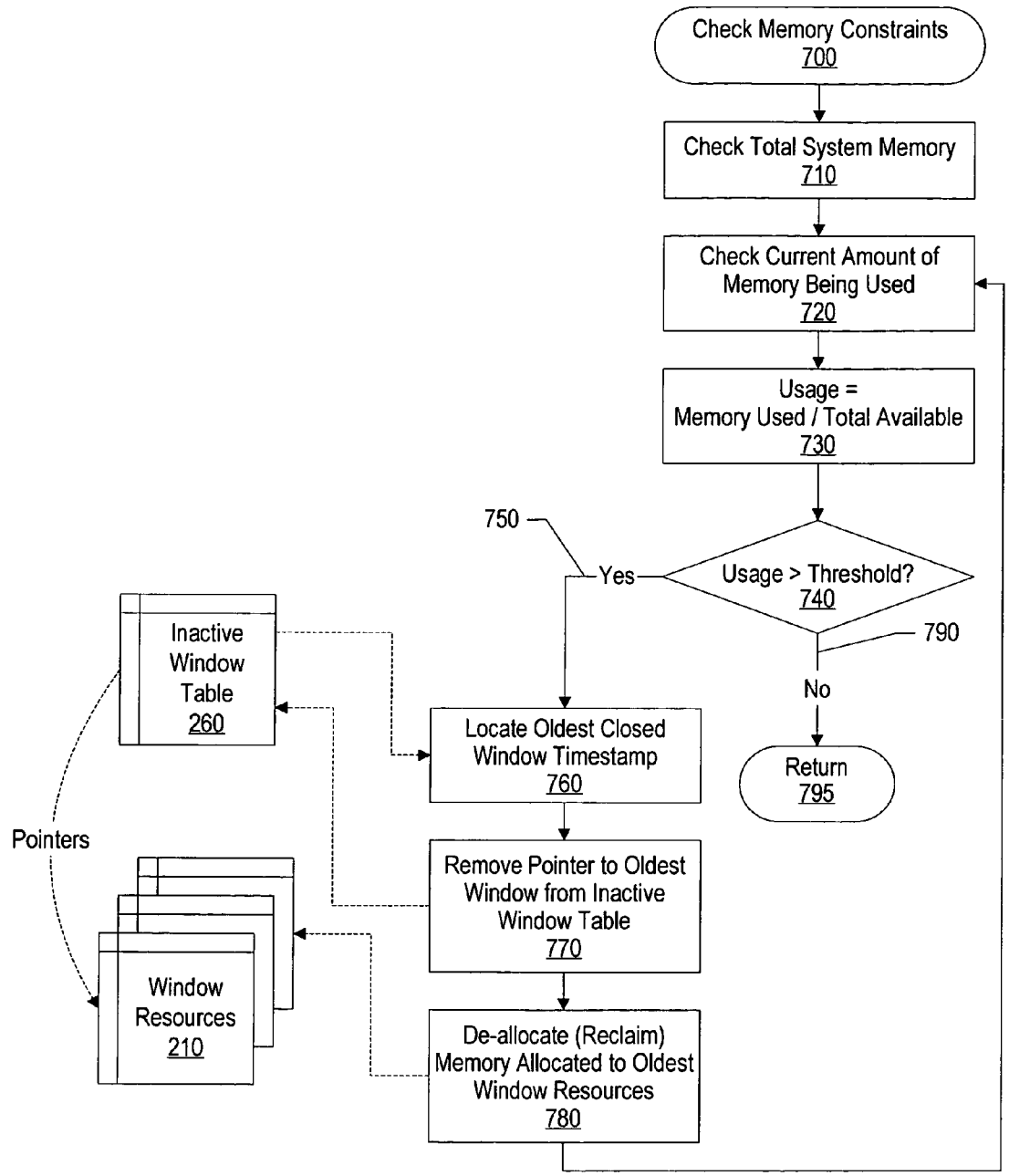
FIG. 7 is a flowchart showing steps taken by the operating system to check whether memory is being constrained.

FIG. 7 is a flowchart showing steps taken by the operating system to check whether the computer system's resources are being constrained. Processing commences at 700 whereupon, at step 710, the system's available resources, such as the amount of system memory, is stored as a variable. At step 720, the amount of system resources, such as memory, that are currently being used is stored as a second variable. In step 730, the usage is calculated by dividing the resources being used by the total available resources.

A determination is made as to whether the usage is greater than a predetermined threshold (decision 740). If the usage is greater than the threshold, decision 740 branches to "yes" branch 750 whereupon the entry corresponding to the oldest inactive window is located in Inactive Window Table 260 based upon the timestamp that corresponds to each entry. At step 770, the entry in Inactive Window Table 260 is deleted and, at step 780, the resources, such as memory, allocated to the inactive window (Window Resources 210) are de-allocated and reclaimed by the operating system. Processing then loops back to re-check the amount of resources currently being used after the resources were de-allocated and another determination is made as to whether the usage level is still greater than the threshold. The looping continues with more entries corresponding to inactive windows being deleted (based upon the entries' timestamp values) and the corresponding resources being reclaimed by the operating system until the usage level is no longer greater than the threshold, at which point decision 740 branches to "no" branch 790 and processing returns at 795.

Figure 8:
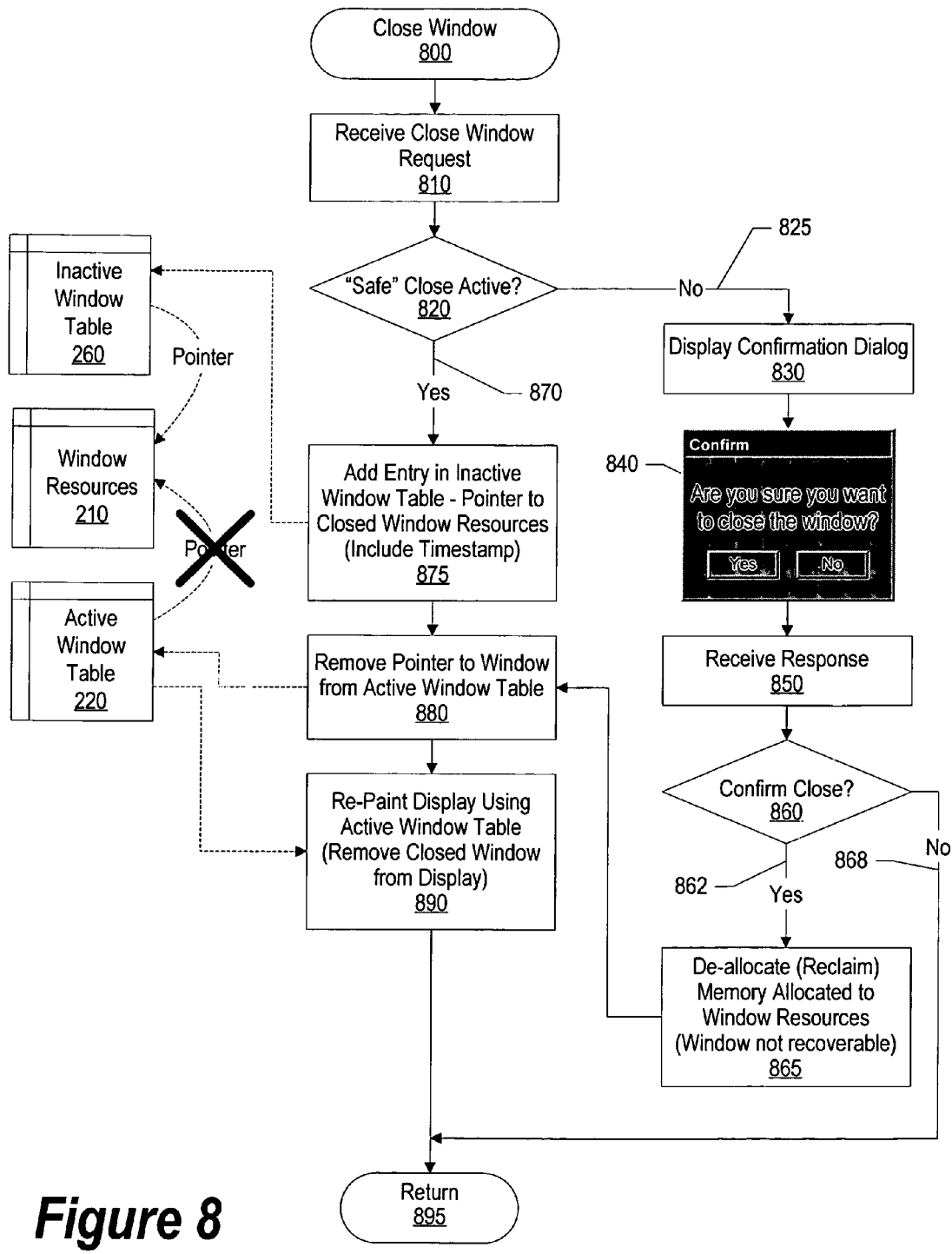
FIG. 8 is a flowchart showing steps taken to determine whether a confirmation dialog is presented to the user based upon whether recoverable windows are being used.

FIG. 8 is a flowchart showing steps taken to determine whether a confirmation dialog is presented to the user based upon whether recoverable windows are being used. The processing shown in FIG. 8 alleviates a common complaint in the prior art where a user closes a window, but a confirmation (i.e., "Are you sure?") dialog appears before the window is actually closed. Because of the frequency of this message, users often press "yes" without reading the confirmation message so that inadvertent closing of windows still occurs.

Processing commences at 800 whereupon, at step 810, a window close request is received from the user. A determination is made as to whether "safe" close (i.e., reclaimable windows) is active (decision 820). If reclaimable windows are not being used (i.e., the prior art method), decision 820 branches to "no" branch 825 whereupon confirmation dialog 840 is displayed to the user (step 830) confirming that the user if the user is sure about closing the window. A response is received to the dialog at step 850. A determination is made as to whether the user confirms closing of the window (decision 860). If the user does not confirm, decision 860 branches to "no" branch 868 whereupon processing returns at 895 without closing the window. On the other hand, if the user confirms closing of the window, decision 860 branches to "yes". branch 862 whereupon, at step 865, resources used by the closed window, such as memory, are reclaimed by the operating system. A pointer to the window's resources in Active Window Table 220 is removed at step 880. At step 890, the display is re-painted using the Active Window Table. Because the closed window no longer exists in the Active Window Table, the re-painted display will no longer include the closed window. Processing then returns at 895.

Returning to decision 820, if "safe" close is active with reclaimable windows, decision 820 branches to "yes" branch 870 whereupon, at step 875, an entry is added to Inactive Window Table 260 with a pointer to the memory area used to store the closed window's resources. A timestamp is also written to the Inactive Window Table in order to manage resource reclamation shown in FIG. 6. As explained above, a pointer to the window's resources in Active Window Table 220 is removed at step 880 and at step 890, the display is re-painted using the Active Window Table. Processing then returns at 895. Note that using the "safe" close (recoverable windows) the user is not presented with an extra "confirmation" dialog, thus increasing the user's efficiency while allowing an inadvertently closed window to be recovered.

Figure 9:
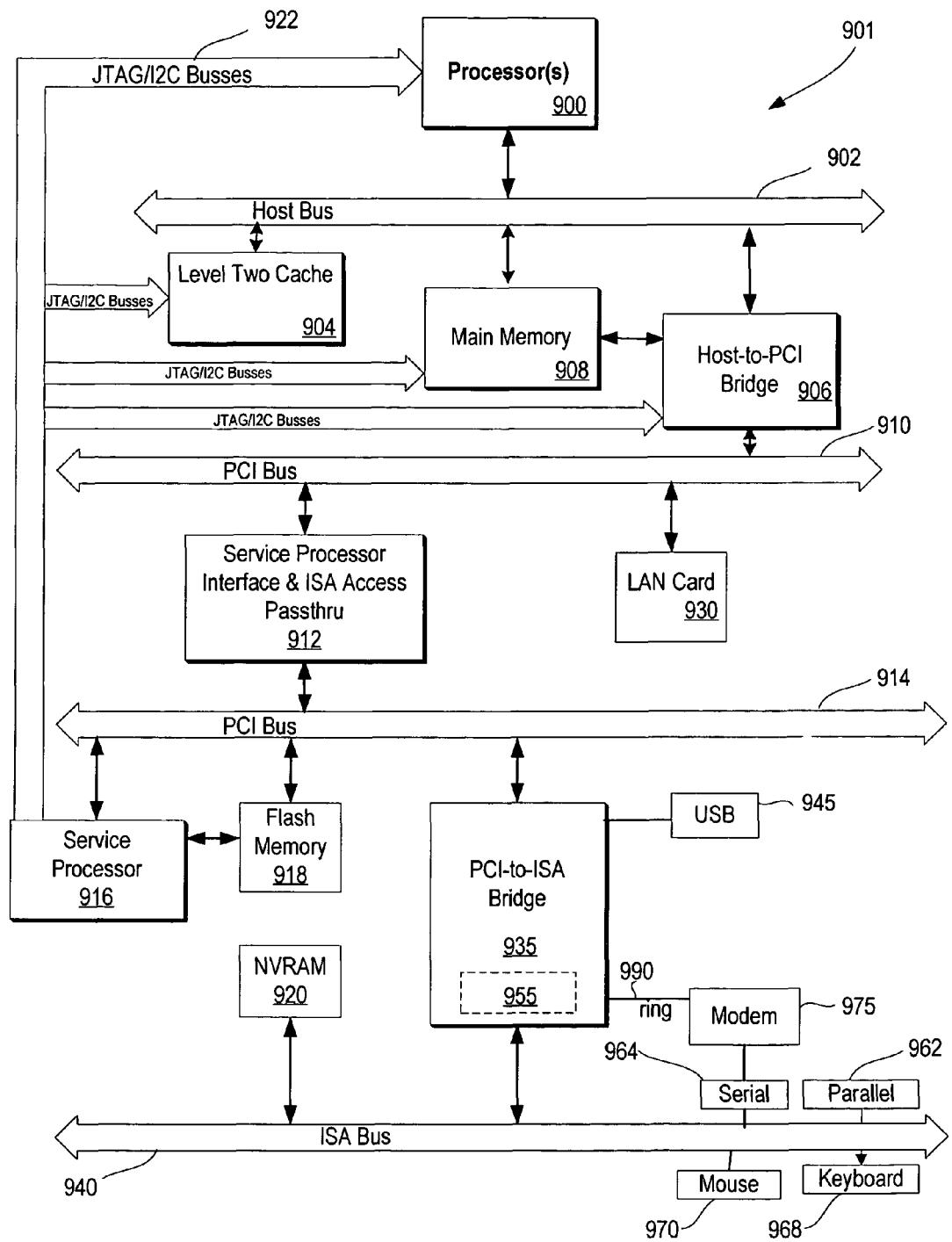
FIG. 9 is a block diagram of an information handling system capable of implementing the present invention.

FIG. 9 illustrates information handling system 901 which is a simplified example of a computer system capable of performing the computing operations described herein. Computer system 901 includes processor 900 which is coupled to host bus 902. A level two (L2) cache memory 904 is also coupled to host bus 902. Host-to-PCI bridge 906 is coupled to main memory 908, includes cache memory and main memory control functions, and provides bus control to handle transfers among PCI bus 910, processor. 900, L2 cache 904, main memory 908, and host bus 902. Main memory 908 is coupled to Host-to-PCI bridge 906 as well as host bus 902. Devices used solely by host processor(s) 900, such as LAN card 930, are coupled to PCI bus 910. Service Processor Interface and ISA Access Pass-through 912 provides an interface between PCI bus 910 and PCI bus 914. In this manner, PCI bus 914 is insulated from PCI bus 910. Devices, such as flash memory 918, are coupled to PCI bus 914. In one implementation, flash memory 918 includes BIOS code that incorporates the necessary processor executable code for a variety of low-level system functions and system boot functions.

PCI bus 914 provides an interface for a variety of devices that are shared by host processor(s) 900 and Service Processor 916 including, for example, flash memory 918. PCI-to-ISA bridge 935 provides bus control to handle transfers between PCI bus 914 and ISA bus 940, universal serial bus (USB) functionality 945, power management functionality 955, and can include other functional elements not shown, such as a real-time clock (RTC), DMA control, interrupt support, and system management bus support. Nonvolatile RAM 920 is attached to ISA Bus 940. Service Processor 916 includes JTAG and I2C busses 922 for communication with processor(s) 900 during initialization steps. JTAG/I2C busses 922 are also coupled to L2 cache 904, Host-to-PCI bridge 906, and main memory 908 providing a communications path between the processor, the Service Processor, the L2 cache, the Host-to-PCI bridge, and the main memory. Service Processor 916 also has access to system power resources for powering down information handling device 901.

Peripheral devices and input/output (I/O) devices can be attached to various interfaces (e.g., parallel interface 962, serial interface 964, keyboard interface 968, and mouse interface 970 coupled to ISA bus 940. Alternatively, many I/O devices can be accommodated by a super I/O controller (not shown) attached to ISA bus 940.

In order to attach computer system 901 to another computer system to copy files over a network, LAN card 930 is coupled to PCI bus 910. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
receiving one or more window close requests from a user, each of the window close requests corresponding to a different window visible on a computer display and actively managed by an operating system, wherein data pertaining to each of the windows is stored in a memory;
retaining the data pertaining to each of the windows and inactivating each of the windows in response to receiving the window close requests, wherein the inactivating results in the windows no longer being visible on the computer display and the operating system no longer actively managing the inactivated windows and storing an inactivation timestamp for each of the inactivated windows, which results in one or more inactivation timestamps, wherein each of the inactivation timestamps corresponds to a time at which its corresponding window was inactivated;
reading one or more user-definable reclamation settings wherein one of the user-definable settings is a time limit;
retrieving a current timestamp;
comparing the difference between each of the inactivation timestamps and the current timestamp to the time limit;
in response to determining that the difference between a first inactivation timestamp that is included in the one or more inactivation timestamps and the current timestamp is greater than the time limit, deleting the data pertaining to a first inactivated window that corresponds to the first inactivation timestamp, the deleting resulting in reclamation of the memory used to store the deleted data;
obtaining a window recover request from the user subsequent to inactivating the window, the window recover request including a selection of a second inactivated window that corresponds to a second inactivation timestamp included in the one or more inactivation time stamps whose difference between the second inactivation timestamp and the current timestamp results in a difference that is less than the time limit; and
reactivating the second inactivated window so that the second window is again visible on the computer display and is actively managed by the operating system.

2. The method of claim 1 further comprising:
retaining a pointer to the inactivated windows;
displaying a list of the inactivated windows in response to obtaining the window recover request; and
receiving a selection from the user corresponding to one of the inactivated windows, wherein the reactivating is performed for the window corresponding to the user selection.

3. The method of claim 1 further comprising:
determining that system memory is constrained; and
deleting the data pertaining to one or more of the inactivated windows in response to the determination until either system memory is no longer constrained or there are no more inactivated windows, the deleting resulting in the reclamation of the memory used to store the deleted data.

4. The method of claim 1 further comprising:
determining whether a window reclamation option is currently active;
responsively displaying a close window confirmation message after receiving the close requests in response to the window reclamation option not being active; and
refraining from displaying the close window confirmation message in response to the window reclamation option being active.

5. An information handling system comprising:
one or more processors;
a memory accessible by the processors for storing window resources;
an operating system that manages the processors;
a display on which one or more windows appear, wherein the operating system manages each of the windows; and
window control software executed by the operating system, the window control software effective to:
receive one or more window close requests from a user, each of the window close requests corresponding to a different window visible on the display and actively managed by the operating system, wherein resources pertaining to each of the windows is stored in the memory;
retain the resources pertaining to each of the windows and inactivate each of the windows in response to receiving the window close requests, wherein the inactivation results in the windows no longer being visible on the computer display and the operating system no longer actively managing the inactivated windows and store an inactivation timestamp for each of the inactivated windows, which results in one or more inactivation timestamps, wherein each of the inactivation timestamps corresponds to a time at which its corresponding window was inactivated;
read one or more user-definable reclamation settings wherein one of the user-definable settings is a time limit;
retrieve a current timestamp;
compare the difference between each of the inactivation timestamps and the current timestamp to the time limit;
in response to determining that the difference between a first inactivation timestamp that is included in the one or more inactivation timestamps and the current timestamp is greater than the time limit, delete the data pertaining to a first inactivated window that corresponds to the first inactivation timestamp, the deleting resulting in reclamation of the memory used to store the deleted data;
receive a window recover request from the user subsequent to inactivating the window, the window recover request including a selection of a second inactivated window that corresponds to a second inactivation timestamp included in the one or more inactivation time stamps whose difference between the second inactivation timestamp and the current timestamp results in a difference that is less than the time limit; and reactivate the second inactivated window so that the second window is again visible on the computer display and is actively managed by the operating system.

6. The information handling system of claim 5 wherein the software is further effective to:

retain a pointer to the inactivated windows;

display a list of the inactivated windows in response to obtaining the window recover request; and receive a selection from the user corresponding to one of the inactivated windows, wherein the reactivating is performed for the window corresponding to the user selection.

7. The information handling system of claim 5 wherein the software is further effective to:

determine that system resources are constrained; and delete the resources pertaining to one or more of the inactivated windows in response to the determination until either system resources are no longer constrained or there are no more inactivated windows, the deletion resulting in the reclamation of resources used by the one or more inactivated windows.

8. A computer program product comprising computer readable code stored in computer memory, the computer readable code being effective to:

receive one or more window close requests from a user, each of the window close requests corresponding to a different window visible on a computer display and actively managed by an operating system, wherein data pertaining to each of the windows is stored in a memory;

retain the data pertaining to each of the windows and inactivating each of the windows in response to receiving the window close requests, wherein the inactivating results in the windows no longer being visible on the computer display and the operating system no longer actively managing the inactivated windows and store an inactivation timestamp for each of the inactivated windows, which results in one or more inactivation timestamps, wherein each of the inactivation timestamps corresponds to a time at which its corresponding window was inactivated;

read one or more user-definable reclamation settings wherein one of the user-definable settings is a time limit;

retrieve a current timestamp;

compare the difference between each of the inactivation timestamps and the current timestamp to the time limit;

in response to determining that the difference between a first inactivation timestamp that is included in the one or more inactivation timestamps and the current timestamp is greater than the time limit, delete the data pertaining to a first inactivated window that corresponds to the first inactivation timestamp, the deleting resulting in reclamation of the memory used to store the deleted data;

receive a window recover request from the user subsequent to inactivating the window, the window recover request including a selection of a second inactivated window that corresponds to a second inactivation timestamp included in the one or more inactivation time stamps whose difference between the second inactivation timestamp and the current timestamp results in a difference that is less than the time limit; and reactivate the second inactivated window so that the second window is again visible on the computer display and is actively managed by the operating system.

9. The computer program product of claim 8 wherein the computer readable code is further effective to:

retain a pointer to the inactivated windows;

display a list of the inactivated windows in response to obtaining the window recover request; and receive a selection from the user corresponding to one of the inactivated windows, wherein the reactivating is performed for the window corresponding to the user selection.

10. The computer program product of claim 8 wherein the computer readable code is further effective to:

determine that system memory is constrained; and delete the data pertaining to one or more of the inactivated windows in response to the determination until either system memory is no longer constrained or there are no more inactivated windows, the deletion resulting in the reclamation of the memory used to store the deleted data.

11. The computer program product of claim 8 wherein the computer readable code is further effective to:

determine whether a window reclamation option is currently active;

responsively display a close window confirmation message after receiving the close requests in response to the window reclamation option not being active; and refrain from displaying the close window confirmation message in response to the window reclamation option being active.

* * * * *